Sept. 26, 1967    V. E. HILDEBRAND    3,344,430
SIGNAL AZIMUTH DETECTOR
Filed Feb. 21, 1966
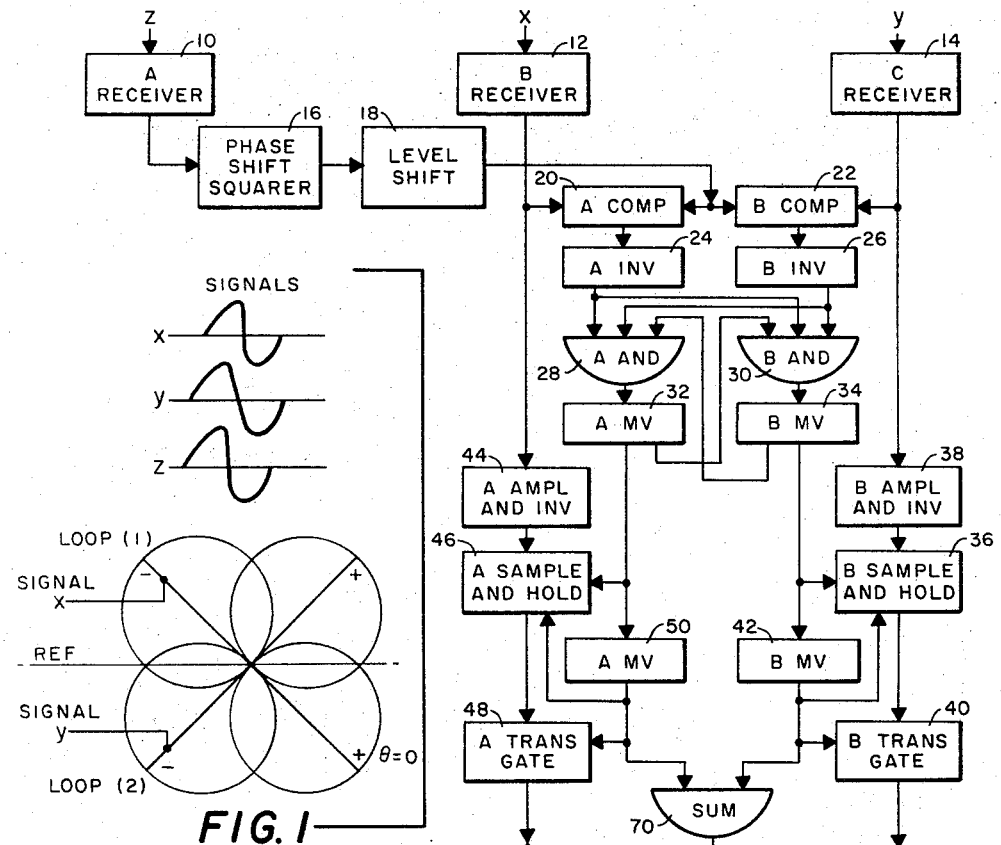
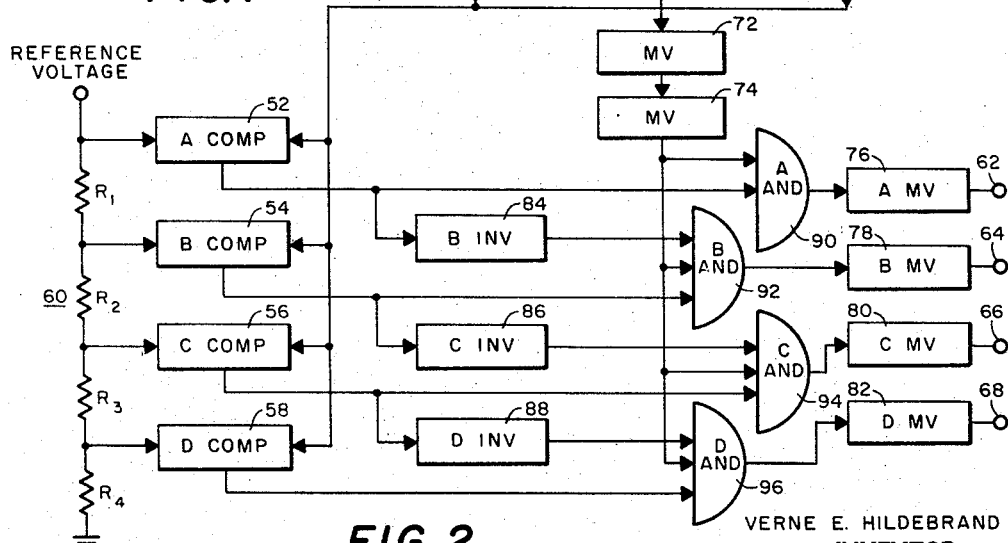
FIG. 1
FIG. 2
VERNE E. HILDEBRAND
INVENTOR.
BY
ATTORNEYS

United States Patent Office 3,344,430
Patented Sept. 26, 1967

3,344,430
SIGNAL AZIMUTH DETECTOR
Verne E. Hildebrand, Riverside, Calif., assignor to the United States of America as represented by the Secretary of the Navy
Filed Feb. 21, 1966, Ser. No. 531,012
6 Claims. (Cl. 343—122)

The invention herein described may be manufactured and used by or for the Government of the United States of America for governmental purposes without the payment of any royalties thereon or therefor.

The present invention relates to signal azimuth detectors and more particularly to automatic azimuth detectors which accurately measure the direction of arrival of a desired signal within a given bearing sector and provide an output pulse indicative of the azimuth of the received signal.

There are no known systems which will classify signal azimuths as is done by the present invention.

Accordingly an object of the present invention is to provide an automatic means of classifying received signals into azimuth sectors.

Other objects and many of the attendant advantages of this invention will become readily appreciated as the same becomes better understood by reference to the following detailed description when considered in connection with the accompanying drawings wherein:

FIG. 1 is a loop antenna pattern diagram used in the explanation of the theory of operation of the invention.

FIG. 2 is a block diagram of a preferred embodiment of the invention.

The invention derives its ability to determine the direction-of-arrival of a received signal from the reception pattern of a loop antenna. The signal to be detected is received on a pair of loop antennas placed orthogonally and oriented in such a manner that the center of the angle sector to be measured bisects the quadrant identified by the common positive loop pattern (FIG. 1). The positive portion of a loop pattern is specified as that half of the pattern which receives the same polarity as a monopole. The mathematical expression for the pattern of a loop antenna is $X = A \cos \phi$, where $\phi = o$ along the axis of the antenna on the positive side of pattern. In FIG. 1 the instantaneous value of the received signal is modified respectively by each antenna as follows:

Loop (1) $X = A \cos \phi$
Loop (2) $Y = A \sin \phi$ where $\phi$ increases counterclockwise from loop (1) positive value. At $\phi = 45°$, along the reference line for azimuth indication, $X = Y$; for $\phi$ between 0° and 45°, X is greater than Y; for $\phi$ between 45° and 90° Y is greater than X. To exclude signals from all other quadrants the polarity of the signal from each loop is compared with the polarity of a signal received on a monopole (Z signal). All signals must be of a positive polarity to initiate the measurement operation. The signal azimuth measurement then is based upon the mathematical relationship:

$$X/Y = \cot \phi$$

In practice however the larger value X or Y is selected; if $X > Y$, then the relationship $X/Y = \cot \phi$ is used; if $Y > X$, then $Y/X = \tan \phi$ is used.

Referring to the black diagram of FIG. 2, the invention can best be described by following the signal flow through the system.

X, Y, and Z signals from the directional loops and omni-directional monopole of antennas, not shown, are respectively passed through receivers 12, 14, and 10 tuned to the desired frequency. Receivers 10, 12, and 14 should have very closely matched gain and phase characteristics. Receivers with closely matched characteristics are readily available in the art. The Z signal is fed from receiver 10 to phase shifter and squarer circuit 16 where it is phase shifted by 90° and squared (made rectangular in shape). The 90° phase shift is necessary because of the different reception characteristics of the monopole and loop receiving antennas.

The squared signal is fed to level shift circuit 18 where it is shifted in level to provide sufficient reference voltage for voltage comparator circuits 20 and 22. The Z signal as fed into the reference terminals of comparator circuits 20 and 22 is in the form of a pulse train with the maximum positive portion having a duration equal to the time that the instantaneous value of the received signal is above the reception threshold. This duration is normally slightly less than one-half cycle of the received frequency.

Signal comparators 20 and 22 are in a ready state during the maximum positive portion of the Z signal. Whenever either the received X or Y signal equals the reference Z signal, an output pulse is generated by the respective comparator circuit. The generated output pulse is fed to a logic network comprised of inverters 24 or 26, and-gate circuits 28 or 30 and multivibrator circuits 32 or 34, which identifies which signal X or Y reached the reference value first. The functions of the logic network are also to select the first signal to arrive, to initiate further operations, and to prevent the latter signal reaching the reference value from initiating further operations. In order to illustrate the operation of the logic circuit, assume that the first output pulse is received from comparator 20. This pulse is fed to inverter 24 and to and-gate 30. The pulse is transmitted through and-gate 30 and fires a one shot multivibrator 34 which in turn inhibits and-gate 28 from firing one shot multivibrator 32 should voltage comparator 22 change state. A similar sequence occurs if comparator 22 produces the first output pulse.

The pulse from multivibrator 34 triggers sample and hold circuit 36 to the hold mode. The Y signal from receiver 14 is amplified and inverted in amplifier and inverter 38 and fed to sample and hold circuit 36. The instantaneous value of the Y signal is held by sample and hold circuit 36 upon being triggered by multivibrator 34. This held value of Y is transmitted through gate 40 after a sufficient time day to allow sample and hold circuit 36 to stabilize. The delay is created by one shot multivibrator 42 which is triggered by multivibrator 34 and in turn triggers gate 40 after a delay of typically fifty microseconds.

Again, if the Y signal is larger a similar sequence occurs in which the X signal is amplified and inverted by amplifier and inverter 44, sampled and held by sample and hold circuit 46 and gated through gate 48 after the proper delay created by multivibrator 50.

The outputs of gates 40 and 48 are connected to voltage comparator circuits 52, 54, 56, and 58. In each of these circuits the value of the signal X or Y depending which was selected is compared with a reference value at respective taps on a voltage divider network 60. The function of comparators 52, 54, 56, and 58 is to provide an indication of the relative value of the sampled signal, the smaller of X or Y, to the reference voltage. This reference voltage is proportional to the largest signal, X or Y, thus a value for the ratio $X/Y$ or $Y/X$ is obtained. The resistance value $R_1$, $R_2$, $R_3$, and $R_4$ in voltage divider network 60 are selected to provide the angular sectors desired based on the relationships $\phi = \tan X/Y$, $\phi' = \cot Y/X$. If the received signal azimuth is between $45° \pm \phi_1$, a pulse will be received at output terminal 62. If the received signal azimuth lies between $45° \pm \phi_1$, and $45° \pm \phi_2$ a signal will be received at output terminal 64. In a similar manner outputs signals would appear at terminals 66 and 68.

Voltage comparators 52, 54, 56, and 58 produce an output pulse when the voltage to be measured, out of gates 40 and 48 is equal to the tap voltage of voltage divider network 60.

To prevent ambiguous outputs at terminals 62, 64, 66, and 68 a logic network comprising summing circuit 70, one shot multivibrators 72, 74, 76, 78, 80, and 82, inverter circuits 84, 86, and 88 and gate circuits 90, 92, 94, and 96. The logic network operates as follows: Pulses from either multivibrator 42 or 50 indicate a measurement is being made and is fed through summing circuit 70 to one shot multivibrator 72 which is triggered and in turn triggers one shot multivibrator 74 after a delay (35 μsec. has been found satisfactory). The delayed triggering of multivibrator 74 produces a read pulse which is fed to gate circuits 90, 92, 94 and 96. Prior to the output pulse from multivibrator 74, the comparator circuits of comparator circuits 52, 54, 56, and 58 which have greater measured voltage than the reference tap voltage will have triggered. The output from each triggered comparator is fed to a corresponding "and" gate and inverter. The configuration of gates 90, 92, 94, and 96 should be such that the necessary condition for an output is that (1) a comparator signal must be incident upon the gate, (2) the read pulse from multivibrator 74 must be incident upon the gate and (3) no inverted signal must be incident upon the gate. This means that only the gate related to the highest valued comparator output will produce an output.

Obviously many modifications and variations of the present invention are possible in the light of the above teachings. It is therefore to be understood that within the scope of the appended claims the invention may be practiced otherwise than as specifically described.

What is claimed is:
1. In a signal azimuth detector, the combination comprising:
 (a) omni-directional radio frequency receiving means,
 (b) first directional radio frequency receiving means for generating signals proportional to the direction and magnitude of received electromagnetic signals,
 (c) second directional radio frequency receiving means for generating signals proportional to the direction and magnitude of received electromagnetic signals from a direction perpendicular to the direction of the received signals of said first directional receiving means,
 (d) first comparator circuit means having a first input coupled to said omni-directional radio frequency receiving means and a second input coupled to said first directional radio frequency receiving means for producing an output signal when said first and second inputs are of equal value,
 (e) second comparator circuit means having a first input coupled to said omni-directional radio frequency receiving means and a second input coupled to said second directional radio frequency receiving means for producing an output signal when said first and second inputs are of equal value,
 (f) a first logic network coupled to the outputs of said first and second comparator circuit means for passing only the first signal produced by either of said comparator circuit means,
 (g) first gate circuit means coupled to said first directional radio frequency receiving means and to the output of said logic network for passing signals received by said first receiving means only when a signal produced by said first comparator is passed by said logic network,
 (h) second gate circuit means coupled to said second directional radio frequency receiving means and to the output of said logic network for passing signals received by said second receiving means only when a signal produced by said second comparator is passed by said logic network,
 (i) third comparator circuit means including a plurality of reference voltages, each representing a sector of a circle, the sum of which equals 360°, for producing an output pulse when an output signal from either of said gate circuit means is equal in value to a reference voltage of said third comparator circuit means,
 (j) a plurality of output terminals equal in number to that of said plurality of reference voltages,
 (k) a second logic network coupled to the output of said first logic network and between the output of said third comparator and said output terminals for passing only the highest valued output from said third comparator to a corresponding output terminal of said plurality of output terminals.

2. The signal azimuth detector of claim 1 wherein said first logic network comprises:
 (a) a first inverter circuit having an input coupled to the output of said first comparator circuit and having an output,
 (b) a second inverter circuit having an input coupled to the output of said second comparator circuit and having an output,
 (c) a first and-gate circuit having first input coupled to the output of said first inverter circuit, a second input coupled to the output of said second inverter circuit, a third input and an output,
 (d) a second and-gate having a first input coupled to the output of said first inverter circuit, a second input coupled to the output of said first inverter circuit, a third input and an output,
 (e) a first one-shot multivibrator having an input coupled to the output of said first and-gate circuit and having an output coupled to the third input of said second and-gate circuit,
 (f) a second one-shot multivibrator having an input coupled to the output of said second and-gate circuit, and having an output coupled to the third input of said first and-gate circuit.

3. The signal azimuth detector of claim 2 wherein said first gate circuit means comprises:
 (a) a first sample and hold circuit having a first input coupled to said first directional radio frequency receiving means, a second input coupled to the output of said first one-shot multivibrator, a third input and having an output,
 (b) a first transmission gate having a first input coupled to the output of said sample and hold circuit, a second input and an output,
 (c) a third one-shot multivibrator having an input coupled to the output of said first one-shot multivibrator and having an output coupled to the second input of said first sample and hold circuit and to the second input of said first transmission gate.

4. The signal azimuth detector of claim 3 wherein said second gate circuit means comprises:
 (a) a second sample and hold circuit having a first input coupled to said second directional radio frequency receiving means, a second input coupled to the output of said second one-shot multivibrator, a third input and having an output,
 (b) a second transmission gate having a first input coupled to the output of said sample and hold circuit, a second input and having an output,
 (c) a fourth one-shot multivibrator having an input coupled to the output of said second one-shot multivibrator and having an output coupled to the third input of said sample and hold circuit and to the second input of said second transmission gate.

5. The signal azimuth detector of claim 4 wherein said third comparator circuit means comprises:
 (a) a reference voltage source having a plurality of taps, each tap providing a different reference voltage,
 (b) a plurality of voltage comparing circuits, each having first and second inputs and an output, each of said first inputs being coupled to different reference voltage taps, respectively, each of said second inputs being coupled to the outputs of said first and second transmission gates.

6. The signal azimuth detector of claim 5 wherein said second logic circuit comprises:
   (a) a summing circuit having a first input coupled to the output of said third one-shot multivibrator, a second input coupled to the output of said fourth multivibrator and having an output,
   (b) a third and-gate circuit having a first input coupled to the output of said summing circuit, a second input coupled to the output of one of said plurality of voltage comparing circuits and an output coupled to one of said plurality of output terminals,
   (c) a third inverter circuit having an input coupled to the output of said one of said plurality of voltage comparing circuits and having an output,
   (d) a fourth and-gate circuit having a first input coupled to the output of said third inverter circuit, a second input coupled to the output of said summing circuit, a third input coupled to the output of a second of said plurality of voltage comparing circuits and an output coupled to a second of said plurality of output terminals,
   (e) a fourth inverter circuit having an input coupled to the output of said second of said plurality of voltage comparing circuits and having an output,
   (f) a fifth and-gate circuit having a first input coupled to the output of said second of said plurality of voltage comparing circuits, a second input coupled to the output of said summing circuit, a third input coupled to the output of a third of said plurality of voltage comparing circuits and having an output coupled to a third of said plurality of output terminals,
   (g) a fifth inverter circuit having an input coupled to the output of the third of said plurality of voltage comparing circuits and having an output,
   (h) a sixth and-gate circuit having a first input coupled to the output of said fifth inverter circuit, a second input coupled to the output of said summing circuit, a third input coupled to the output of a fourth of said plurality of said voltage comparing circuits and having an output coupled to a fourth of said plurality of output terminals.

No references cited.

RODNEY D. BENNETT, *Primary Examiner.*

R. E. BERGER, *Assistant Examiner.*